M. PEARL.
CULINARY VESSEL.
APPLICATION FILED MAR. 10, 1911.
1,055,072.   Patented Mar. 4, 1913.
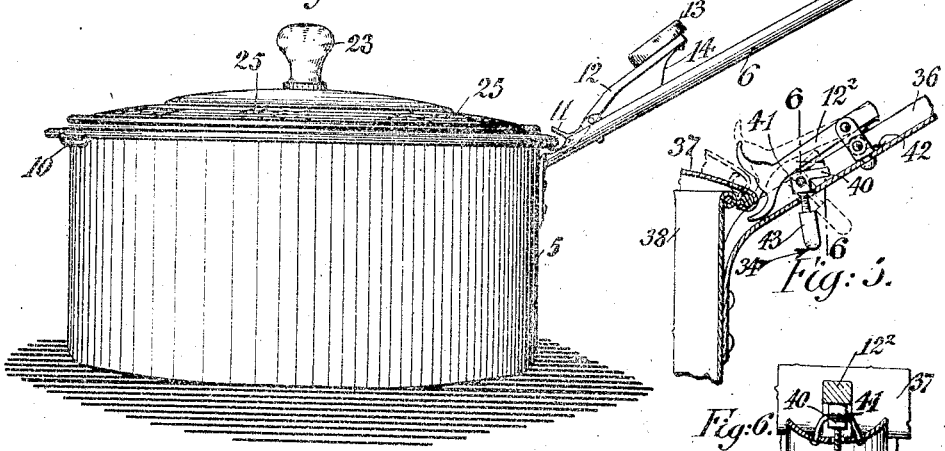
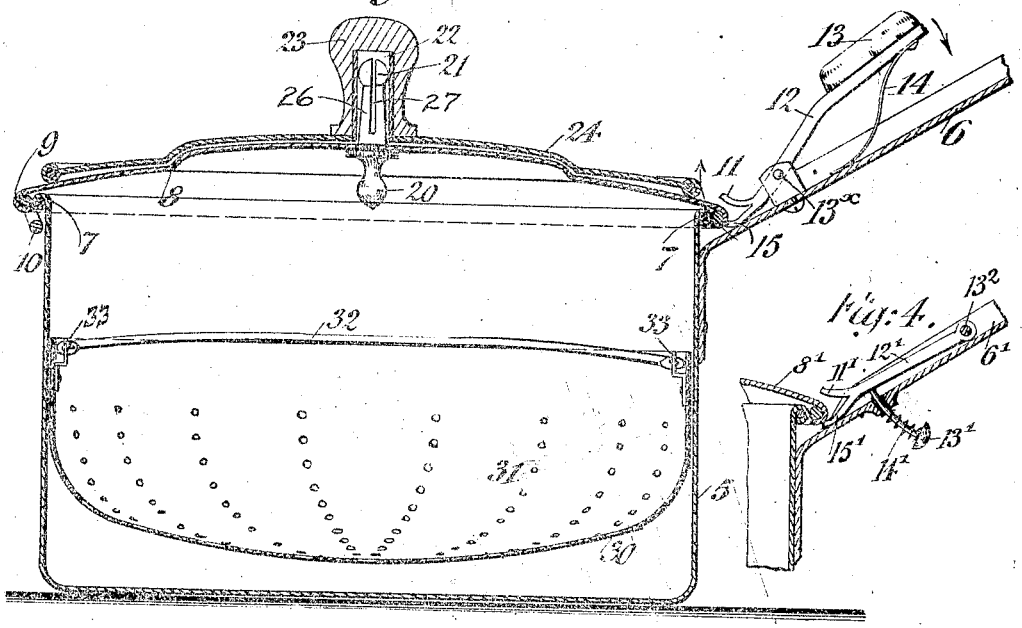
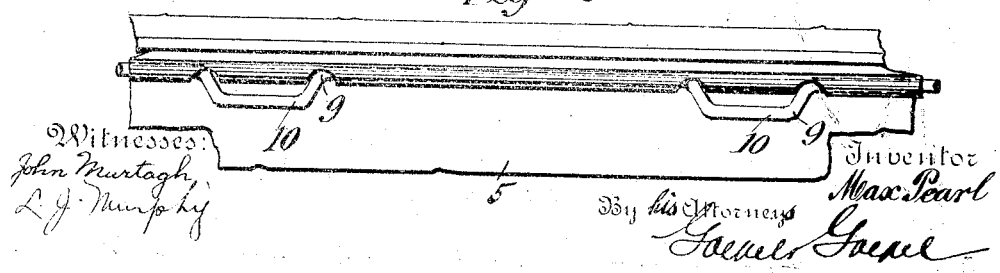
Witnesses:
John Murtagh
L. J. Murphy
Inventor
Max Pearl
By his Attorneys
Goepel Goepel

UNITED STATES PATENT OFFICE.

MAX PEARL, OF NEW YORK, N. Y.

CULINARY VESSEL.

1,055,072.

Specification of Letters Patent.

Patented Mar. 4, 1913.

Application filed March 10, 1911. Serial No. 613,618.

*To all whom it may concern:*

Be it known that I, MAX PEARL, a citizen of the United States, residing in New York, borough of Brooklyn, in the county of Kings and State of New York, have invented certain new and useful Improvements in Culinary Vessels, of which the following is a specification.

This invention relates to an improved arrangement of culinary vessels and covers therefor by which the cover can be quickly removed or replaced on the vessel as required by cooking operations.

The invention relates also to an improved false bottom for the vessel by means of which food in the vessel is held away from the vessel, thereby preventing the burning of the same, and the invention relates further to an improved cover for the vessel by means of which the vessel may be entirely closed by the cover or the cover may be adapted as a strainer for soup or other substances which the vessel may contain so as to prevent the coarser vegetables or the like from being removed with the soup. The cover may also be used for pouring off hot water when boiling potatoes and for other purposes connected with cooking operations in kitchens.

To this end my invention consists of a vessel provided with a cover having lugs on the cover projecting beneath the rim of the vessel and a lever or clip movable to engage the rim of the vessel opposite the lugs for holding the cover on the vessel. In one form of the invention this lever is bifurcated at the inner end, one prong engaging over the edge of the cover and the other prong engaging under said edge.

The invention consists further of a false bottom adjustably disposed in the bottom of the vessel; and the invention also consists in a cover for the vessel comprising a cover plate having an opening and a center-post, and a strainer plate provided with a handle having a tubular opening for firmly engaging said post.

In the accompanying drawings, Figure 1 represents a perspective view of a culinary vessel showing one form of the invention, Fig. 2 is a vertical, central section on an enlarged scale through the cover and body of the vessel and a portion of the handle, Fig. 3 shows the retaining lugs of the cover, Figs. 4 and 5 are vertical, central sections through a portion of the cover, body, and handle, showing modified forms of the device for throwing the cover, and Fig. 6 is a transverse section on line 6—6, Fig. 5.

Similar letters of reference indicate corresponding parts throughout the several figures of the drawings.

Referring to the drawings, the vessel 5 is shown provided with a straight outwardly-extending handle 6 and a slightly projecting rim 7. The cover 8 of the vessel is beaded on the edges so as to inclose a wire 9 and this wire is bent downwardly at certain points to form lugs 10 engaging under the rim 7. These lugs are placed some distance apart and on the opposite sides of the vessel from the handle 6, and when the cover is placed on the vessel these lugs serve for holding one side of the cover in place. The other side of the cover is held in place by means of a suitable locking device. The locking device in this embodiment of the invention comprises a lever 12 fulcrumed as at $13^x$ on the handle 6; the outer end of the lever is provided with a button 13 of some heat insulating material and also with a spring 14 secured to the lever and pressing against the handle 6 whereby the inner forked end 11, 15, of the lever is held in engagement with the beaded edge of the cover and holds the same in engagement with the rim 7 of the vessel. When it is desired to remove the cover the button 13 is depressed and the inner end of the lever raised so that the cover is released and can be removed from the vessel. When replacing the cover, the retaining lug 10 should be placed under the rim of the vessel and the fork, 11, 15, raised so that the opposite side of the rim of the cover can be placed under the upper member 11 of said fork for being locked by the same.

In Fig. 4, the locking device takes the form of a lever $12^1$ fulcrumed on the handle $6^1$ at $13^2$, the inner end of the lever being bifurcated, the upper member of the fork being adapted to engage over the edge of the cover $8^1$ and hold the same firmly upon the vessel. The lower member $15^1$ of the fork engages under the edge of the cover, and when it is desired to remove the cover it is only necessary to press upon the button $13^1$ of the lever, the lower member $15^1$ of the fork then forcing the edge of the cover away from the vessel so that the cover may be readily removed. A compression spring $14^1$ between the button head and the handle $6^1$ returns the lever to depressed position and retains the same therein.

The cover 8 is provided with a dependent handle 20 on its concave or under side and with an upwardly extending center post 26 projecting above the convex or top side of said cover. This center post has at its upper end a rounded knob 21 and it is provided with an open slot 27 which extends downward through the center post into the shank thereof. To the cover-handle is rigidly secured a strainer-plate 24 having perforated portions 25 and also unperforated portions, any of which are adapted to be turned into register with suitable openings in the cover 8 whereby the vessel may be entirely closed, when the unperforated part is in register with said opening, or whereby when said perforated part is in register with the opening the cover for the vessel is formed into a suitable strainer. The slotted knobbed center post 26 is laterally expansible and the knob 21 thereof is friction tight against the sides of the socket of the handle 23 of the strainer and operates to hold said cover and strainer together. When the strainer and cover are separated the center post serves as a handle for the convex side of the cover. In order to protect the foods being cooked in the vessel against burning or sticking on the bottom of the vessel, I have provided a false bottom or protector 30 comprising a basket-like compartment having perforations 31 therein, by means of which the liquids in the vessel may flow from the lower to the upper part of the vessel and vice versa, in order to secure a proper circulation. The side of the protector 30 engages with the walls of the vessel frictionally and is held in position firmly enough to remain in any position placed, so that it may be easily withdrawn by means of the bail or handle 32 suitably secured to the hooks 33 at the sides of the protector. Because of the frictional connection between the protector 30 and the walls of the vessel, the protector may be placed at any height desired from the bottom of the protector, as may be required for the particular article being cooked.

My invention therefore consists of a culinary vessel provided with a cover having lugs projecting beneath the rim, and a lever or clip movable to engage the rim of the vessel opposite the lugs for holding the cover upon the vessel; also in the false bottom, and the cover with detachable strainer-plate.

I do not limit myself to the exact form of the invention as herein described, and various changes may be made in the details of construction without departing from the spirit of the invention.

A further modification is shown in Figs. 5 and 6, in which the lever $12^2$ is operated by an elbow-lever 40 pivoted at 41 to the handle 36, the lever $12^2$ being held down by a spring 42. When the handle 43 is pulled in the direction of the arrow 34, then the lever is raised so as to disengage the cover 37 from the vessel 38.

Having thus described my invention, I claim as new and desire to secure by Letters Patent:

1. The combination with a culinary vessel, provided with a handle, of a cover provided with one or more lugs in its circumference, and a spring actuated lever secured to the handle, the inner end of said lever having two prongs, one of which engages above the rim of the cover and the other below said rim.

2. The combination with a culinary vessel having a handle and an outwardly projected beaded rim, of a cover having a downwardly extending rim adapted to fit around the rim of the vessel, lugs on the rim of the cover and adapted to engage under the rim of the vessel and a lever on said handle having a bifurcated inner end having upper and lower forks, said upper fork engaging over the rim of the cover to hold the same in place, said lower fork engaging under the rim of the cover and adapted to push the cover from the vessel when said lever is moved.

3. A culinary vessel cover comprising a cover plate provided with an upwardly projecting laterally elastic post having a knob at its upper end and an open slot extending downward through said knob into the shank of the post, and a detachable strainer plate fitting over said cover plate and provided with a hollow handle forming a socket, said laterally expansible center post frictionally engaging by its knob the wall of said socket for holding said plates together and serving as a handle for the cover when the plates are separated.

4. A culinary vessel cover comprising a cover plate provided with a central opening, a center post provided with a dependent handle and with an upward split extension projecting through said opening and provided with an expansible head, and a detachable strainer plate adapted to surmount said cover plate and provided with a hollow handle closed at its upper end and adapted to frictionally engage and cover the expansible extension of said center post.

In testimony, that I claim the foregoing as my invention, I have signed my name in presence of two subscribing witnesses.

MAX PEARL.

Witnesses:
John Murtagh,
L. J. Murphy.